D. DEWEY.
Horse Rake.
No. 472.
Patented Nov. 23, 1837.
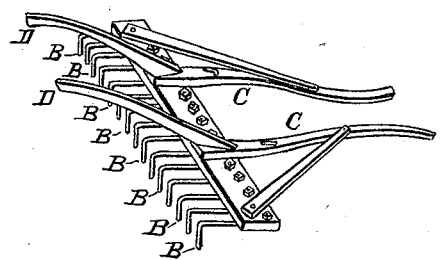

UNITED STATES PATENT OFFICE.

DAVID DEWEY, OF POULTNEY, VERMONT.

IMPROVEMENT IN HORSE-RAKES.

Specification forming part of Letters Patent No. 472, dated November 23, 1837.

*To all whom it may concern:*

Be it known that I, DAVID DEWEY, of Poultney, in the county of Rutland and State of Vermont, have invented a new and useful Improvement in a Horse-Rake, called a "Spring-Tooth Horse-Rake;" and I do hereby declare that the following is a full and exact description of the construction and operation of said rake or machine as invented or improved by me.

This rake consists of a head, A, eighteen teeth, B B, thills C C, and handles D D. The head is ten feet long, three inches wide, and one and one-half inch thick. Two thills seven feet long are placed upon the upper side of the head, to which they are fastened by bolts and screws. The rake is drawn by hooks fastened to the upper sides of the thills, near the head, to which the tugs of the harness are attached, the forward ends of the thills being attached to the harness in the usual manner. Two handles are placed upon the ends of the thills where they are attached to the head, and are confined with the thills by the same bolts. These handles extend backward from the thills by which the rake is managed. A brace extends from each end of the head to each thill, being bolted onto the head and thill. The teeth are placed equidistant upon the under side of the head. They are made of iron, steel, or other elastic rods from one-quarter to one-half inch in diameter, or of sufficient strength to rake the hay, and are three feet long. They are bent at right angles one foot from their ends, forming a perpendicular of one foot, which bears upon the ground when the rake is in motion. From these angles the teeth extend two feet horizontally forward to the head of the rake, near the front side of the same, when they are bent upward at right angles and extend through the head, and are confined upon the upper side of the same with nuts and screws. They are also confined on the under side of the head by means of staples driven crosswise the teeth near the back side of the head.

What I claim as my improvement in the above-described machine, not before used or known before my application, is—

The iron, steel, or other elastic rods or teeth, as above specified.

In testimony that the above is a true specification of my said improvement as above described I have hereunto set my hand this 22d day of June, A. D. 1837.

DAVID DEWEY.

Witnesses:
JAMES S. HARRIS,
EBEN WALLIS.